C. MARTRATT.
Hand-Seeder.

No. 15,616.  Patented Aug. 26. 1856.

Witnesses:

Inventor:
Cornelius Martratt.

UNITED STATES PATENT OFFICE.

CORNELIUS MARTRATT, OF ALBANY, NEW YORK.

IMPROVEMENT IN HAND CORN-PLANTERS.

Specification forming part of Letters Patent No. 15,616, dated August 26, 1856.

*To all whom it may concern:*

Be it known that I, CORNELIUS MARTRATT, of the city and county of Albany, in the State of New York, have invented a new and useful Hand Corn-Planter; and I do hereby declare the following specification, with the drawings hereto annexed as part of the same, to be a full and perfect description thereof, similar letters in the different figures denoting the same parts of the apparatus.

Figure 1:
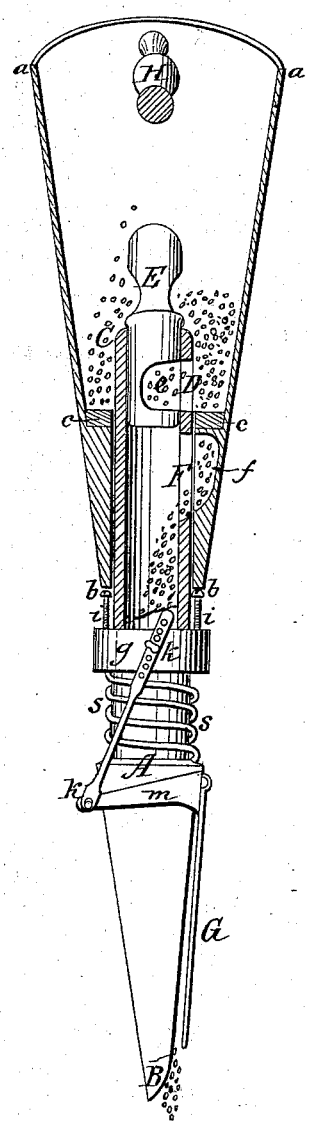
Figure 2:
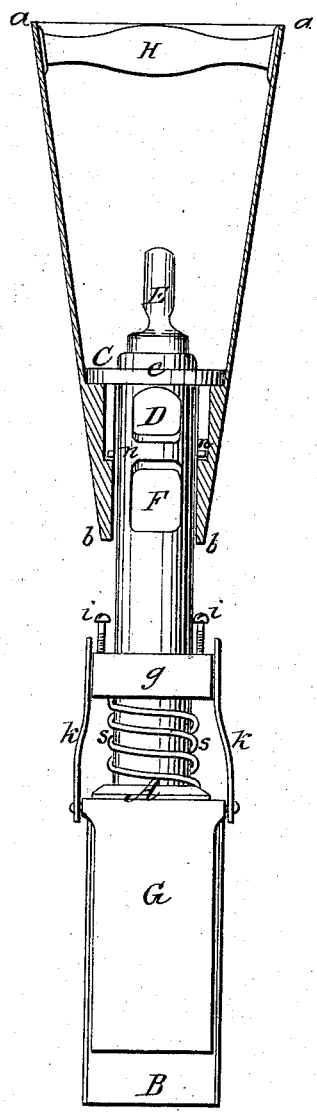

Figure 1 represents the machine in profile, the seed-reservoir and that part of the spade-staff which lies within the reservoir being shown in a vertical section through the plane of its axis. Fig. 2 represents a diagram of the same.

A B is a spade attached to a staff, A C, which staff is hollow through its length. Upon the staff slides the reservoir or magazine $a$ $a$ $b$ $b$, divided into two parts, the lower part of which is separated from the upper by a diaphragm or collar, of leather, $c$ $c$, secured to the top of this lower part and fitting tightly against the staff, so as to prevent any grain from passing into the lower section of the reservoir except what passes, as hereinafter shown, within the body of the staff itself. The upper part of the staff is pierced with a lateral orifice, D, opening into the central hollow of the staff, and the staff has a plug or spigot, E, passing down into it from above, which has a chamber or cavity, $e$, scooped into it of such size that the orifice D and this cavity $e$ shall receive and hold the proper quantity of seed to be carried in this way within the body of the staff, as aforesaid, into the lower section of the reservoir and planted at one spading. Plugs having different-sized cavities can be used to regulate the amount of seed to be planted at one spading. A second recess or cavity, $f$, is scooped into the lower section of the reservoir to receive the grain carried down into this lower section in the upper recess or cavity, $e$, and at a proper point below the orifice D a second orifice, F, is cut into the staff to receive the grain from the cavity $e$ and pass it down through the hollow of the staff to the spade. The staff is prevented from turning round in the reservoir by two guide-pins, $n$ $n$, Fig. 2, traversing in vertical guides or slots cut into the sides of the lower chamber.

The spade B has a cover or valve, G, which closes its sides and bottom, so as to prevent the grain which has passed down through the staff from escaping until it is opened at the proper time by the action upon it of the reservoir, which action is regulated by the following apparatus: $g$ is a collar fitted to pass freely along the staff. It is kept up by a spiral spring, $s$ $s$, interposed between itself and the neck of the spade. From the top of the valve G an arm, $m$, extends back, to which is pivoted a rod, $k$, which extends upward to the collar $g$, to which it is secured by a pin. The collar, by the pressure of the spring, habitually keeps the valve closed, and the pressure of the spring can be regulated by shifting the pin into a series of holes in the upper part of the rod. For the purpose hereinafter set forth, there are adjusting-screws, $i$ $i$, which screw up and down into the upper part of the collar, with their heads in range with the lower edge of the reservoir.

H is a handle attached to the upper part of the reservoir, with which to manage the planter spade fashion.

The operation of the planter is as follows: Taking the machine in your hand by the handle H, and pressing downward, the entire reservoir or hopper slides down the staff A C to the screws $i$ $i$, when of course the recess or cavity $e$ passes up into the upper section of the hopper and is filled with corn. Then, when the hand draws the machine upward, the hopper slides up again, and the cavity $e$, with the corn in it, passes down into the lower section and discharges itself into the second cavity, $f$. Placing the spade again upon the earth and pressing downward, the cavity $f$ passes down and discharges itself through the orifice F into the hollow of the staff. The time of this discharge, or, perhaps, more properly speaking, the amount of power expended before this discharge can take place, is governed by the higher or lower position of the screws $i$ $i$, and as the depth which the spade enters into the earth is governed by the greater or lesser time that the power is applied to it, it follows that the corn may be made to drop when the spade is at whatever depth thought proper. Thus, if I run in the screws $i$ $i$ till their heads approach close to the collar $g$, the cavity $f$ will of course cover or come opposite the orifice F, and so discharge the grain into the hollow of the staff before the spade is any very measurable depth into the ground, whereas if I run up the screws there will be more power expended, and the spade be consequently a greater depth into the earth before the cavity *f* passes down far enough to discharge itself into the orifice F, as aforesaid. Therefore, according to the power required to penetrate hard or soft ground, the corn can be detained in the reservoir until that amount of power is employed—a feature that no other corn-planter, that I know of, possesses. Again, placing the machine against the earth and pressing downward, it will be seen that the power is transmitted from the hand to the collar *g*, and thence through the spiral spring *s s* to the shoulders of the spade A B. Thus the spade, together with the lower end of the valve G, (the valve being yet closed,) enters the earth, and when it has entered to a certain depth the valve G, operated by the collar *g* through the rods *k*, opens, and the corn drops into the earth. Should this valve open before the spade has penetrated to the proper depth into the earth, the earth would fill up the space into or through which the corn should drop, and thus—though by my invention, described in the foregoing, the corn falls into the hollow of the staff at the right moment of time—it would be deposited more or less too near the top of the ground; but it will be seen that the time of the opening of this valve, as related to the depth of the penetration of the spade, is governed by the strength of resistance of the spring *s s*, and that as this strength or resistance is governed by the length of the rods *k* the time of the opening of the valve is under the control of the operator. Thus, if I am operating in hard ground, where it requires, say, fifteen pounds of power to sink the spade to the proper depth, I shorten the rods to that point which will cause the spring to resist that, or, rather, more than that, amount of power before it will allow the collar *g* to pass down upon the staff far enough to open the valve sufficiently to let out the corn, while if I am operating in ground requiring but ten pounds of power to sink the spade to the proper depth, I reduce in the same ratio the resistance of the spring by lengthening the rods *k*. According, therefore, to the power required to penetrate hard or soft ground, the earth, by this invention, is kept out of the space intended for the corn until that amount of power is expended—a feature that no other corn-planter, that I know of, possesses.

Having thus described my invention, what I claim as new, and desire to secure by Letters Patent, is—

The combination of the staff A C, collar *g*, and spade A B, with reservoir *a a b b*, the whole being arranged and operated in the manner and for the purpose described.

CORNELIUS MARTRATT.

Witnesses:
 RICHD. VARICK DEWITT,
 WILLIAM DEERING.